US012583007B2

(12) United States Patent
Chaney et al.

(10) Patent No.: US 12,583,007 B2
(45) Date of Patent: Mar. 24, 2026

(54) SPRAY PERFORMANCE DEVIATION DETECTION

(71) Applicant: Deere & Company, Moline, IL (US)

(72) Inventors: Mark M. Chaney, Ankeny, IA (US); Michael P. Schlax, Yarmouth, ME (US); Tarik Loukili, Urbandale, IA (US); Joshua J. Carson, Urbandale, IA (US)

(73) Assignee: Deere & Company, Moline, IL (US)

( * ) Notice: Subject to any disclaimer, the term of this patent is extended or adjusted under 35 U.S.C. 154(b) by 168 days.

(21) Appl. No.: 18/240,969

(22) Filed: Aug. 31, 2023

(65) Prior Publication Data

US 2025/0073732 A1 Mar. 6, 2025

(51) Int. Cl.
| | |
|---|---|
| *B05B 12/08* | (2006.01) |
| *B05B 12/00* | (2018.01) |
| *A01C 23/04* | (2006.01) |
| *A01G 25/09* | (2006.01) |

(Continued)

(52) U.S. Cl.
CPC .......... *B05B 12/084* (2013.01); *B05B 12/004* (2013.01); *A01C 23/047* (2013.01); *A01G 25/09* (2013.01); *A01M 7/0089* (2013.01); *A01M 21/043* (2013.01)

(58) Field of Classification Search
CPC ... B05B 12/084; B05B 12/004; A01C 23/047; A01C 23/04; A01C 23/00; A01C 23/005; A01C 23/003; A01C 23/001; A01G 25/09; A01M 7/0089; A01M 7/0096; A01M 21/043; A01M 21/04
See application file for complete search history.

(56) References Cited

U.S. PATENT DOCUMENTS

| | | | |
|---|---|---|---|
| 7,311,004 | B2 | 12/2007 | Giles |
| 10,772,253 | B2 | 9/2020 | Calleija et al. |

(Continued)

FOREIGN PATENT DOCUMENTS

| | | | | |
|---|---|---|---|---|
| DE | 102019000792 A1 | 8/2020 | | |
| EP | 3162448 A1 * | 5/2017 | ........... | B05B 1/3013 |

(Continued)

OTHER PUBLICATIONS

Extended European Search Report and Written Opinion issued in European Patent Application No. 24189614.1 dated Feb. 3, 2025, in 08 pages.

*Primary Examiner* — Erin M Piateski
*Assistant Examiner* — Ashley Tiffany Schoech
(74) *Attorney, Agent, or Firm* — Fenwick & West LLP

(57) ABSTRACT

For each of a plurality of spray nozzles of an autonomous agricultural vehicle, a set of instructions provided by the autonomous agricultural vehicle to the spray nozzle is accessed. Each instruction in the set is generated by analyzing a respective image of a portion of a geographic area captured by the autonomous agricultural vehicle. A spray performance of at least one spray nozzle from among the plurality of spray nozzles is identified as an outlier by analyzing the sets of instructions respectively provided to the plurality of spray nozzles. An action with respect to the at least one spray nozzle identified as the outlier is performed. The action may be to place the vehicle in fallback state in which a targeted spray may be switched to broadcast spray.

20 Claims, 11 Drawing Sheets

(51) Int. Cl.
    *A01M 7/00*         (2006.01)
    *A01M 21/04*       (2006.01)

(56)             References Cited

U.S. PATENT DOCUMENTS

| | | | |
|---|---|---|---|
| 11,659,793 B2 * | 5/2023 | Redden | A01C 21/007 |
| | | | 701/50 |
| 2015/0308744 A1 * | 10/2015 | Fukuda | F23J 15/006 |
| | | | 34/527 |
| 2019/0124907 A1 | 5/2019 | Kolb et al. | |
| 2019/0358660 A1 | 11/2019 | Paralikar et al. | |
| 2020/0230633 A1 * | 7/2020 | Serrat | A01M 21/043 |
| 2022/0250108 A1 * | 8/2022 | Ampatzidis | B05B 12/122 |
| 2022/0287290 A1 * | 9/2022 | Glasbrenner | A01M 7/0089 |
| 2023/0022504 A1 * | 1/2023 | Maurer | B05B 12/004 |

FOREIGN PATENT DOCUMENTS

| | | | | |
|---|---|---|---|---|
| EP | 3517267 A1 * | 7/2019 | | B05B 13/0473 |
| EP | 3991553 A1 | 5/2022 | | |
| WO | WO-2022043511 A1 * | 3/2022 | | A01M 7/0089 |

* cited by examiner

System
Environment
200

Figure 6:
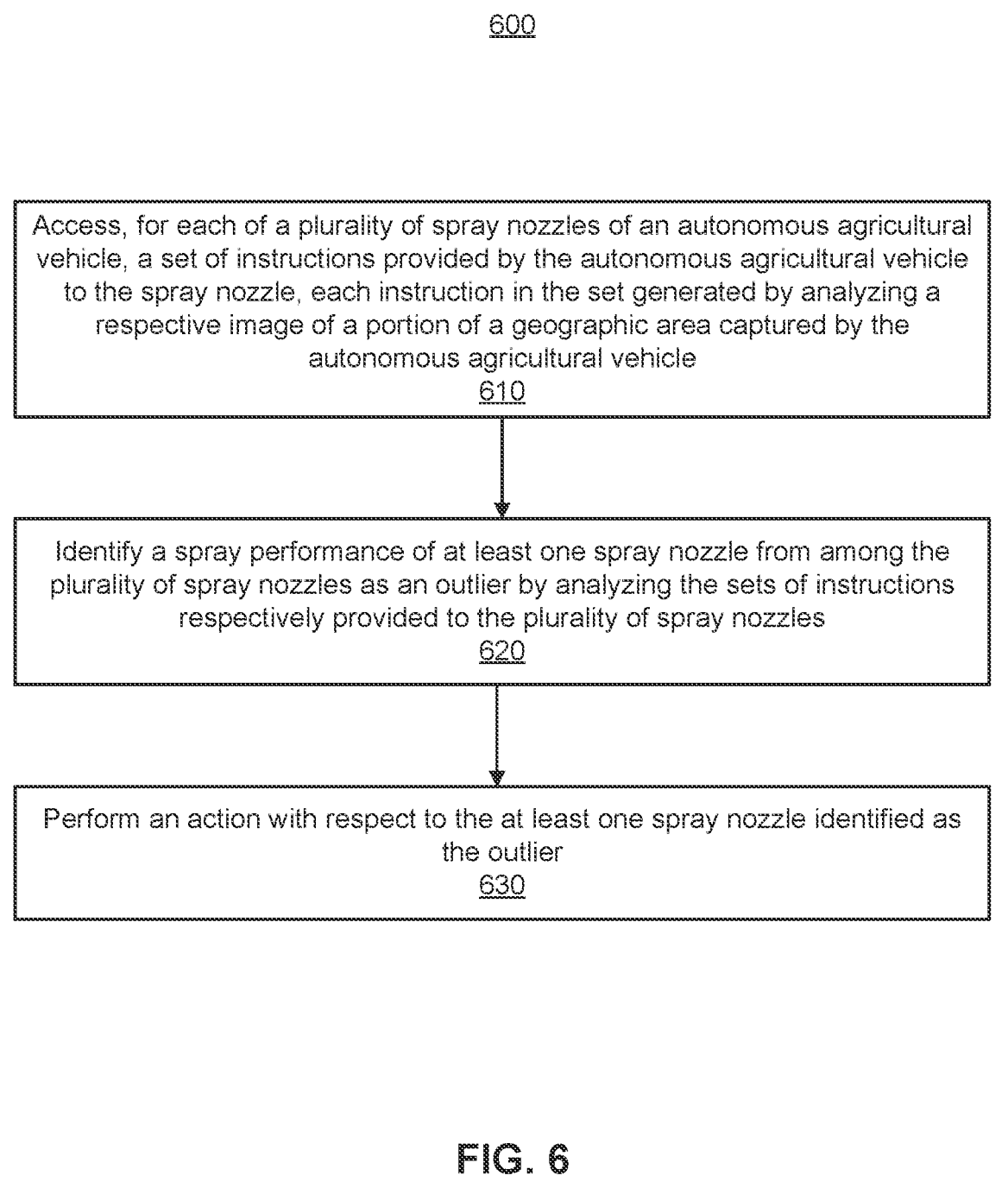

_600_

Access, for each of a plurality of spray nozzles of an autonomous agricultural vehicle, a set of instructions provided by the autonomous agricultural vehicle to the spray nozzle, each instruction in the set generated by analyzing a respective image of a portion of a geographic area captured by the autonomous agricultural vehicle
_610_

Identify a spray performance of at least one spray nozzle from among the plurality of spray nozzles as an outlier by analyzing the sets of instructions respectively provided to the plurality of spray nozzles
_620_

Perform an action with respect to the at least one spray nozzle identified as the outlier
_630_

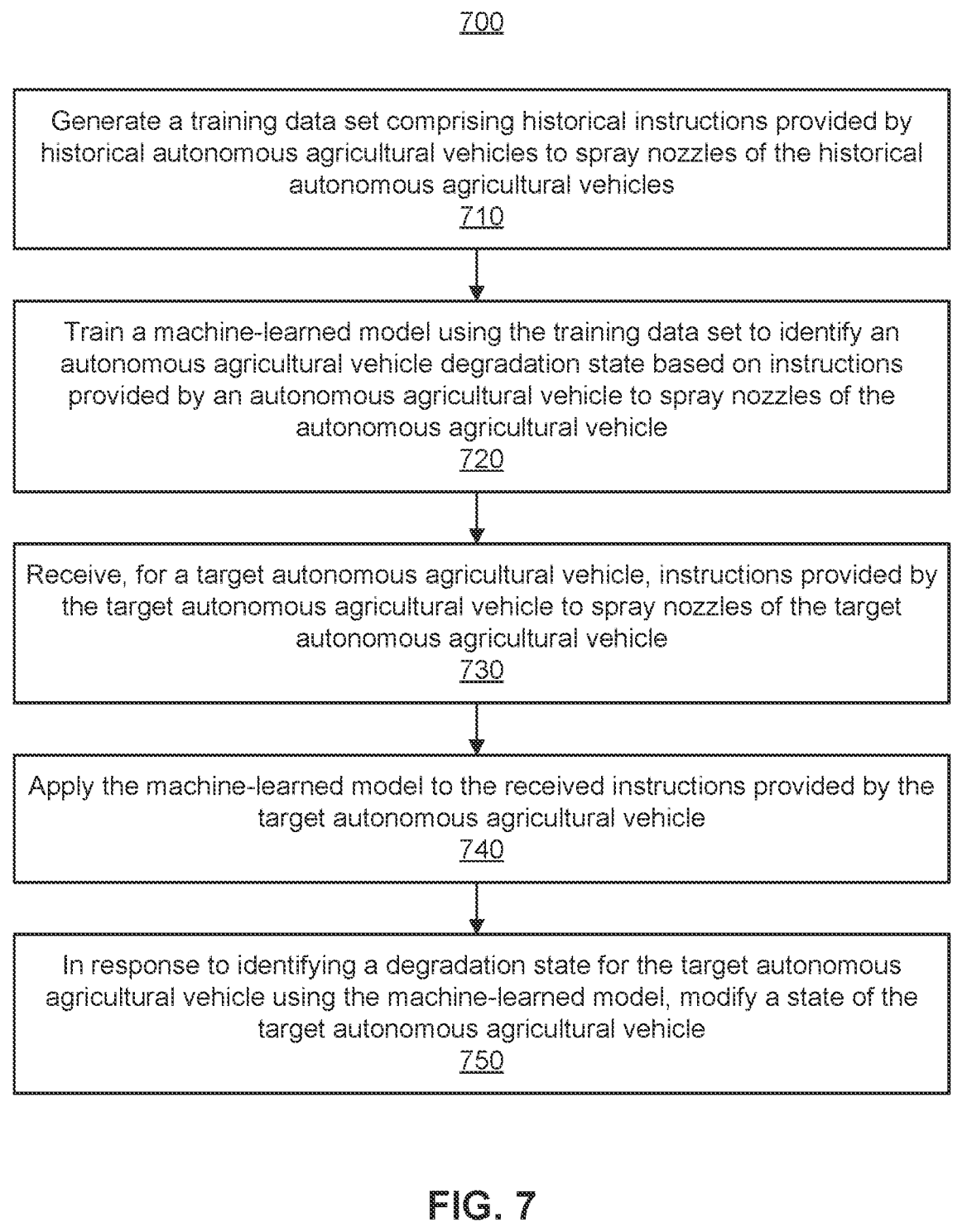

Generate a training data set comprising historical instructions provided by historical autonomous agricultural vehicles to spray nozzles of the historical autonomous agricultural vehicles
710

Train a machine-learned model using the training data set to identify an autonomous agricultural vehicle degradation state based on instructions provided by an autonomous agricultural vehicle to spray nozzles of the autonomous agricultural vehicle
720

Receive, for a target autonomous agricultural vehicle, instructions provided by the target autonomous agricultural vehicle to spray nozzles of the target autonomous agricultural vehicle
730

Apply the machine-learned model to the received instructions provided by the target autonomous agricultural vehicle
740

In response to identifying a degradation state for the target autonomous agricultural vehicle using the machine-learned model, modify a state of the target autonomous agricultural vehicle
750

FIG. 7

SPRAY PERFORMANCE DEVIATION DETECTION

TECHNICAL FIELD

This disclosure relates to identifying and treating plants and, more specifically, to detecting a deviation in spray performance of spray nozzles for treating plants.

BACKGROUND

A farming machine may include components to complete treatment actions in a field (e.g., spraying herbicides to control weeds) as the farming machine navigates through the field. To reduce crop stress while providing an effective crop protection strategy, it may be desirable to target spray pesticides. For example, a target herbicide spray strategy to kill weeds may lower costs by applying only what is needed, when and where it is needed. Such a target spray strategy may employ computer vision and machine learning techniques to detect target weeds from crop plants and activate spray nozzles with individual nozzle control to apply precise droplet sizing for consistent targeted spray that reduces over-application amount and off-target drift. Fault detection may be performed in such targeted spray systems to detect faults in different components of the system (e.g., image sensor, spray nozzle) that causes degradation in spray performance. However, it is difficult to reliably detect all faults that may be causing the system to locally underspray or overspray during the targeted spray operation.

SUMMARY

This disclosure pertains to systems and methods for detecting degradation in spray performance of an autonomous agricultural vehicle. Techniques disclosed herein look to supplement existing fault detection systems by automatically identifying additional fault states and taking appropriate action. In one or more embodiments, the system detects patterns that represent statistical anomalies based on nozzle instructions transmitted to spray nozzles by the autonomous agricultural vehicle. For example, based on measured signals from image sensors, the system may generate instructions to be provided to the spray nozzles, and based on the instructions, the system may generate composite scores. The composite scores may be compared to determine whether there is a threshold level of difference between the spray performance corresponding to an image sensor or a corresponding spray nozzle and the spray performance corresponding to neighboring image sensors or spray nozzles.

The system may be further configured to take one or more actions based on the determination. For example, if the deviation satisfies a low confidence threshold, the system may automatically place the corresponding image sensor or nozzle (or all of the sensors or nozzles) into a fallback state (e.g., fallback to a broadcast spray operation instead of the targeted spray operation; fallback to a state in which the spray operation is paused pending maintenance (e.g., replacement or service of one or more components) or user intervention). In one or more embodiments, if the deviation does not degrade to the level defined by the low confidence threshold, the system may take steps to compensate for the deviation. For example, the system may include logic to adjust sensitivity settings of the target image sensor, thereby correcting for a localized underspray or overspray condition in the targeted spray operation. The system may further be configured to convey the anomaly to the user during operation. For example, the system may identify specific image sensors or spray nozzle(s) that are determined to be "outliers" based on a reference as gleaned from performance of a larger set of image sensors or spray nozzles. The operations described above may be performed by a control system disposed onboard the autonomous agricultural vehicle. In one or more embodiments, one or more components (or corresponding functions) of the control system may alternately be disposed offboard the autonomous agricultural vehicle, e.g., on a remote server connected to the autonomous agricultural vehicle via a network (e.g., local area network, the Internet). As described herein, an autonomous agricultural vehicle may be a vehicle that autonomously navigates a field to perform an autonomous targeted spray operation with spray nozzles, or a vehicle that performs an autonomous spray operation with the spray nozzles while being manually navigated by an operator.

In one or more embodiments, techniques disclosed herein further look to leverage data (e.g., sensor data, navigation data, verification data, field characteristics, vehicle characteristics, treatment characteristics, nozzle instructions generated based on measured sensor data) generated from respective (fully autonomous or partially autonomous) targeted spray operations of a plurality of autonomous agricultural vehicles operating in respective fields in one or more geographic areas. The data may be received by a centralized server (e.g., on the "cloud") and utilized to train one or more machine-learned models to perform one or more prediction tasks with respect to a target autonomous agricultural vehicle.

In one or more embodiments, a machine-learned model may be trained using the received data to identify a degradation state of the target vehicle. For example, if the spray performance during the targeted spray operation is degraded in a similar manner for all image sensors or all corresponding spray nozzles (e.g., due to a faulty batch of image sensors), a reference point to determine spray performance degradation for a particular image sensor or corresponding spray nozzle based on data from a larger set of image sensors or corresponding nozzles may be unavailable. In this case, the machine-learned model may utilize data from other sources (e.g., from other vehicles operating in the same or other similar field characteristics, vehicle characteristics, treatment characteristics, and the like; data from historical targeted spray operations for the target vehicle from prior seasons, and the like) to analyze the spray performance of the autonomous agricultural vehicle.

In one or more embodiments, system may further be configured to modify a state of the target vehicle based on identification of the degradation state. For example, if the identified degradation state meets a low confidence threshold, the system may automatically switch the spraying behavior of the target vehicle to a fallback mode (e.g., switch from targeted spray to broadcast spray, pause the targeted spray operation, switch from autonomous targeted spray to manual operation). As another example, the system may convey the identified degradation state to a user during the targeted spray operation, and further identify one or more components (e.g., nozzle actuation mechanisms, image sensors, other electronics) with respect to which the degradation state has been detected. As yet another example, based on the detected degradation state, the system may identify and automatically change (or notify a user to change) one or more settings of the vehicle (e.g., change vehicle navigation speed, change boom position or orientation, change one or more settings of one or more cameras, change one or more settings of one or more spray nozzle actuation mechanisms).

In one or more embodiments, a machine-learned model may be trained using the received data to estimate product usage for tank volume. For example, in case of a targeted spray of herbicide for a particular field, the machine-learned model may provide an estimate of an amount of herbicide that will be needed to perform the targeted spray operation in the field.

In one or more embodiments, a method includes a plurality of steps. The plurality of steps includes a step of accessing, for each of a plurality of spray nozzles of an autonomous agricultural vehicle, a set of instructions provided by the autonomous agricultural vehicle to the spray nozzle, each instruction in the set generated by analyzing a respective image of a portion of a geographic area captured by the autonomous agricultural vehicle. In addition, the plurality of steps further includes a step of identifying a spray performance of at least one spray nozzle from among the plurality of spray nozzles as an outlier by analyzing the sets of instructions respectively provided to the plurality of spray nozzles. Still further, the plurality of steps includes a step of performing an action with respect to the at least one spray nozzle identified as the outlier.

In one or more embodiments, a method includes a plurality of steps. The plurality of steps includes a step of generating a training data set comprising historical instructions provided by historical autonomous agricultural vehicles to spray nozzles of the historical autonomous agricultural vehicles. In addition, the plurality of steps includes a step of training a machine-learned model using the training data set to identify an autonomous agricultural vehicle degradation state based on instructions provided by an autonomous agricultural vehicle to spray nozzles of the autonomous agricultural vehicle. Still further, the plurality of steps includes a step of receiving, for a target autonomous agricultural vehicle, instructions provided by the target autonomous agricultural vehicle to spray nozzles of the target autonomous agricultural vehicle. Yet still further, the plurality of steps includes a step of applying the machine-learned model to the received instructions provided by the target autonomous agricultural vehicle. And still further, the plurality of steps includes a step of, in response to identifying a degradation state for the target autonomous agricultural vehicle using the machine-learned model, modifying a state of the target autonomous agricultural vehicle.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6 is a flow chart illustrating a process of identifying a spray nozzle whose spray performance is an outlier, in accordance with one or more embodiments.

FIG. 7 is a flow chart illustrating a process of identifying a degradation state of a farming machine using a machine-learned model, in accordance with one or more embodiments.

DETAILED DESCRIPTION

Figure 1A:
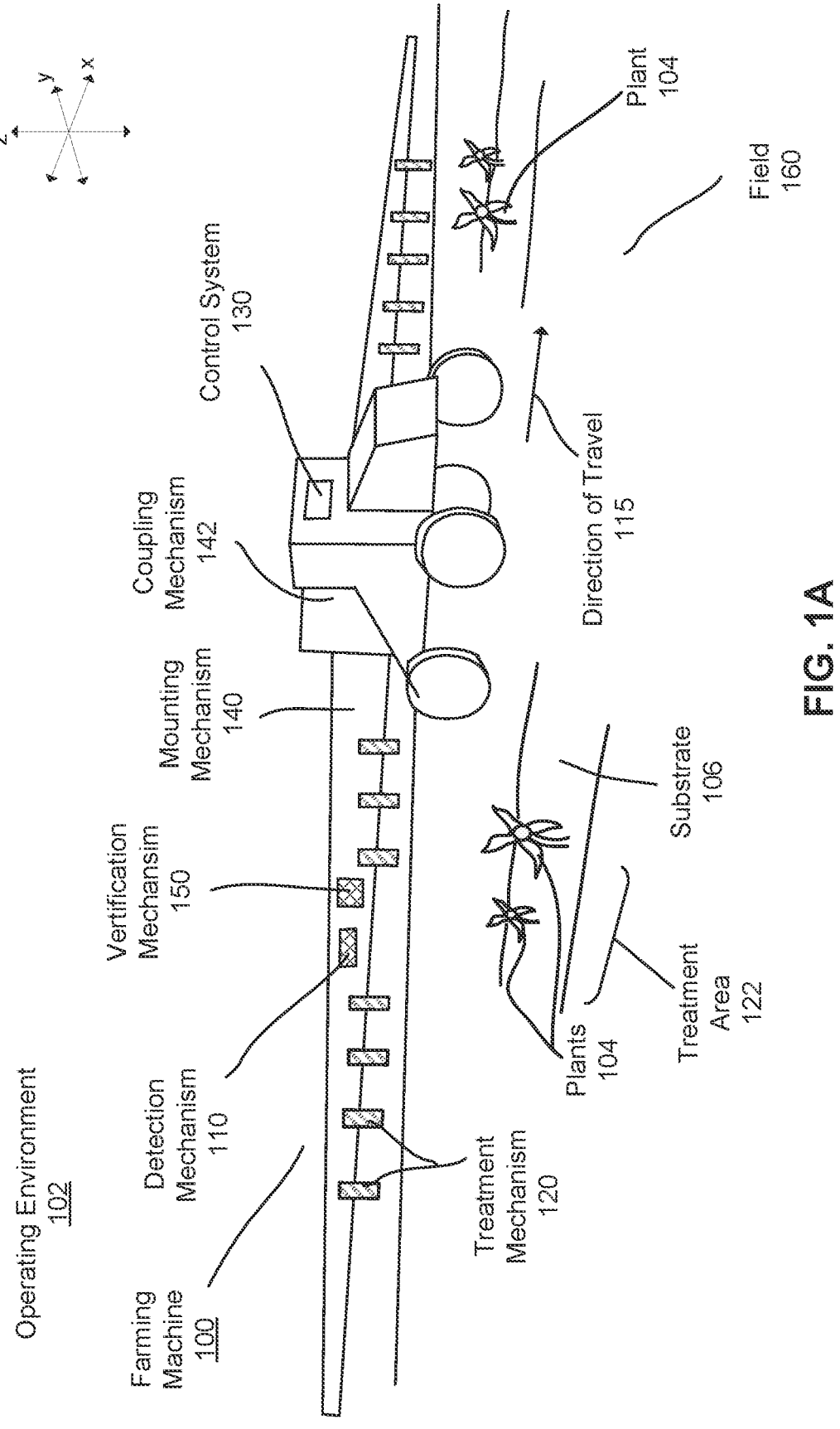
FIG. 1A illustrates a side view of a farming machine, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Field Management and Treatment Plans

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine-learned computer model, etc. In some cases, a manager may be a combination of the managers described above. For example, a manager may include a farmer assisted by a machine-learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

Farming Machine Configuration Example

A farming machine (e.g., autonomous agricultural vehicle) that implements farming actions of a treatment plan may have a variety of configurations, some of which are described in greater detail below.

Figure 1B:
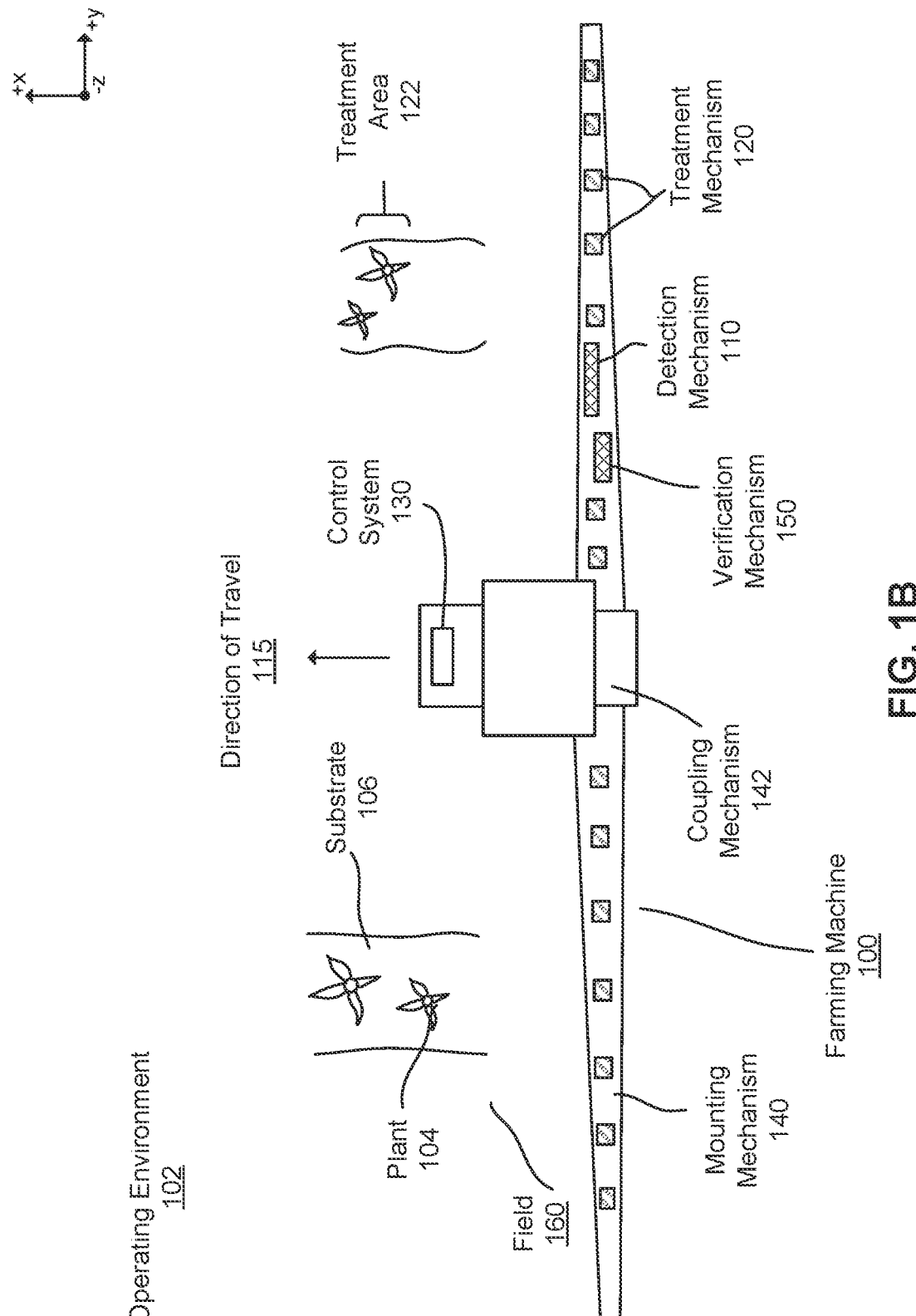
FIG. 1B illustrates a front view of the farming machine, in accordance with one or more embodiments.
Figure 1C:
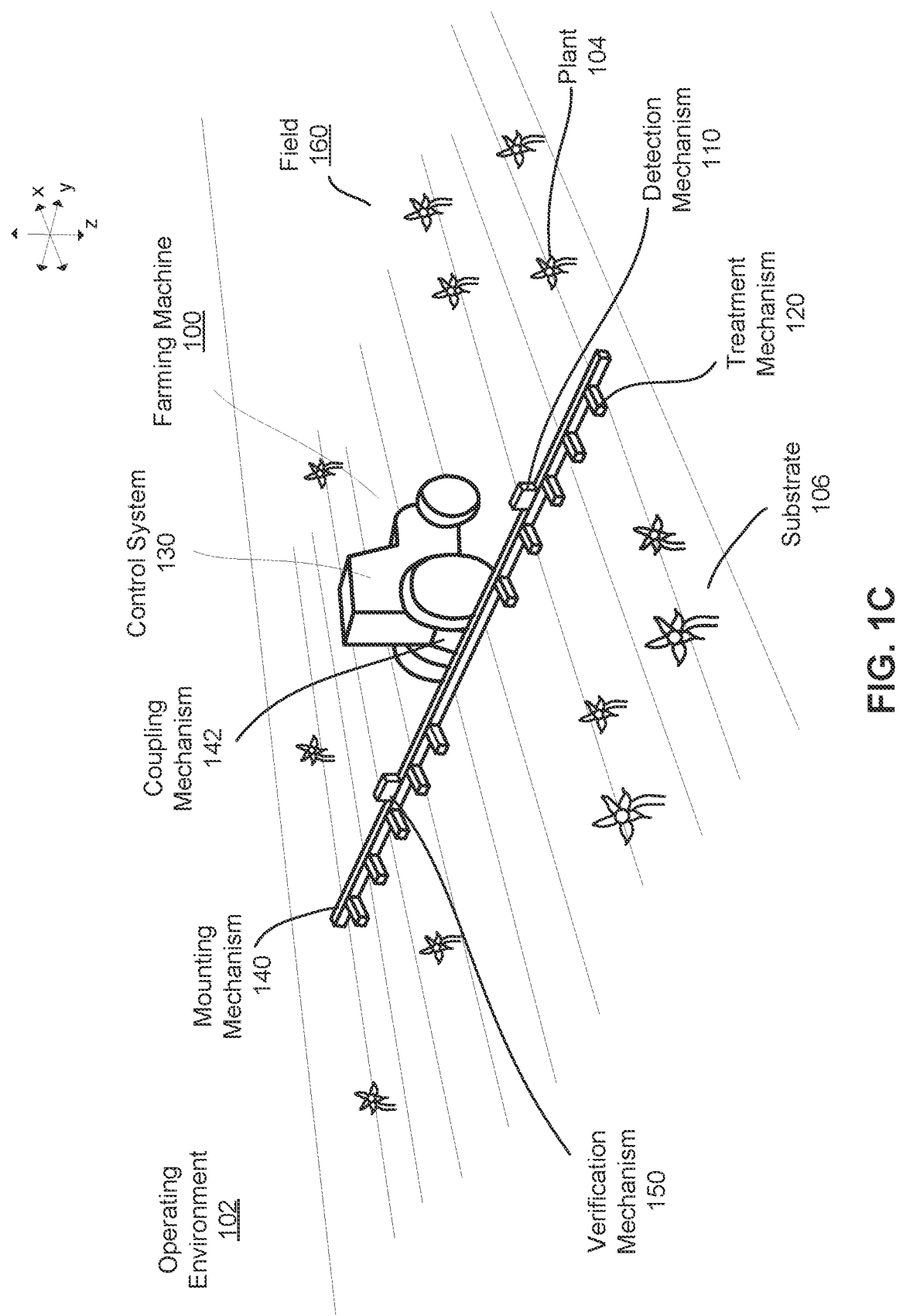
FIG. 1C illustrates an isometric view of the farming machine, in accordance with one or more embodiments.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below. Some of the functionality of the farming machine 100 as described herein may be subsumed by other entities. For example, at least some of the functionality of the control system 130 as described herein may be subsumed by a central server connected to the farming machine 100 over a network.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crops. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions (e.g., by generating instructions to spray nozzles for a targeted spray operation) in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor.

Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action (e.g., by providing instructions that dictate spray performance of spray nozzles) based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104 (e.g., spray performance).

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

The farming machine 100 may include a treatment mechanism 120. The treatment mechanism 120 can implement farming actions (e.g., targeted spray) in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Depending on the configuration, the farming machine 100 may include various numbers of treatment mechanisms 120 (e.g., 1, 2, 5, 20, 60, 72, 97, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured to input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120 (e.g., targeted spray instructions to spray nozzles) that is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly. Operation and functionality of the control system 130 is described in greater detail below in relation to FIGS. 2 and 3 below.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

In various configurations, the farming machine 100 may include any number of additional components. For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

Example System Environment

Figure 2:
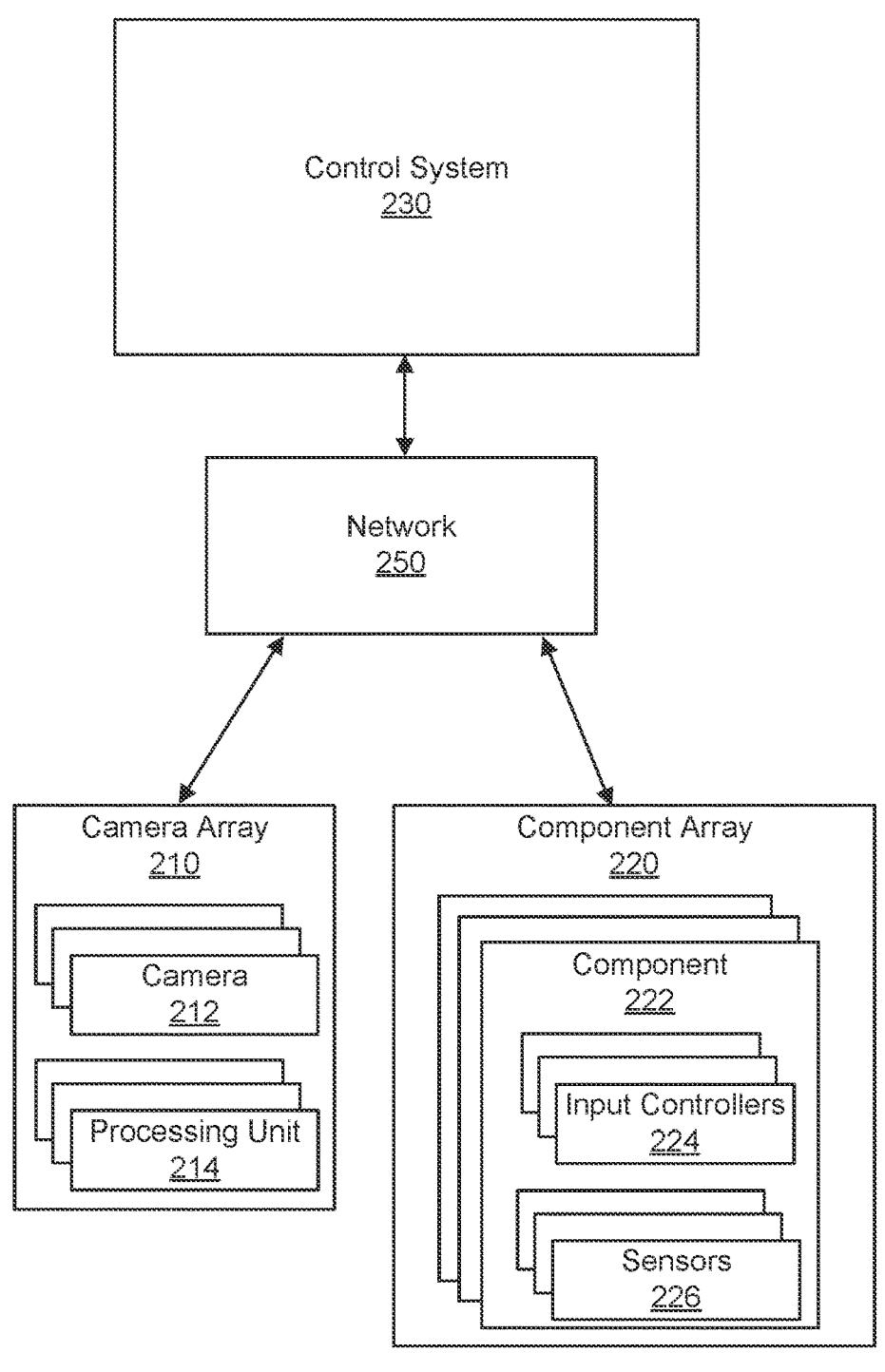
FIG. 2 is a block diagram of a system environment for the farming machine, in accordance with one or more embodiments.

FIG. 2 is a block diagram of a system environment 200 for the farming machine 100 of FIGS. 1A-1C, in accordance with one or more embodiments. In this example system environment 200 of FIG. 2, a control system 230 is connected to a camera array 210 and component array 220 via a network 250. The camera array 210 includes one or more cameras 212. The cameras 212 may be a detection mechanism 110 as described in FIG. 1. Each camera 212 in the camera array 210 may be controlled by a corresponding processing unit 214 (e.g., a graphics processing unit). In some examples, more than one camera 212 may be controlled by a single processing unit 214. The array 210 captures image data of the scene around the farming machine 100. For example, each camera 212 in the camera array 210 captures an image of a portion of a geographic area. The captured image data may be sent to the control system 230 via the network 250 or may be stored or processed by other components of the farming machine 100.

The component array 220 includes one or more components 222. Components 222 are elements of the farming machine that can take farming actions (e.g., a treatment mechanism 120). As illustrated, each component has one or more input controllers 224 and one or more sensors 226, but a component may include only sensors or only input controllers. An input controller controls the function of the component. For example, an input controller may receive machine commands (e.g., nozzle instructions) via the network and actuate the component (e.g., spray nozzle) in response. A sensor 226 generates measurements within the system environment. The measurements may be of the component, the farming machine, or the environment surrounding the farming machine. For example, a sensor 226 may measure a configuration or state of the component 222 (e.g., a setting, parameter, power load, etc.), or measure an area surrounding a farming machine (e.g., moisture, temperature, etc.). In one or more embodiments, components 222 may include one or more spray nozzles to spray, e.g., a measured quantity of a chemical (e.g., herbicide, pesticide, etc.) or biological element on an identified plant or portion of the plant (e.g., targeted spray operation). As another example, components 222 may include one or more spray nozzles to spray, e.g., a predetermined quantity of hot liquid (e.g., hot oil) on an identified plant or portion of the plant. As another example, components may include one or more spray components to spray, e.g., a predetermined quantity of fluid (e.g., hot fluid like steam or flame, pressurized fluid like a pressurized water jet, and the like). "Components" 222 may be interchangeably referred to herein as "spray nozzles" 222 or "nozzles" 222, and "component array" 220 may be interchangeably referred to herein as "spray nozzle array" 220.

The control system 230 receives information from the camera array 210 and the component array 220, determines treatment plans, and performs actions based on the treatment plans. For example, the control system 230 controls one or more of the components 222 to perform one or more treatment actions based on a determined treatment plan for an identified plant. Operation and functionality of the control system 230 is described in greater detail below in relation to FIG. 3.

The network 250 connects nodes of the system environment 200 to allow microcontrollers and devices to communicate with each other. In one or more embodiments, the components are connected within the network as a Controller Area Network (CAN). In this case, within the network each element has an input and output connection, and the network 250 can translate information between the various elements. For example, the network 250 receives input information from the camera array 210 and the component array 220, processes the information, and transmits the information to the control system 230. The control system 230 generates a treatment plan including a treatment action based on the information and transmits instructions (e.g., instructions to the spray nozzles) to implement the treatment plan to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

Example Control System

Figure 3:
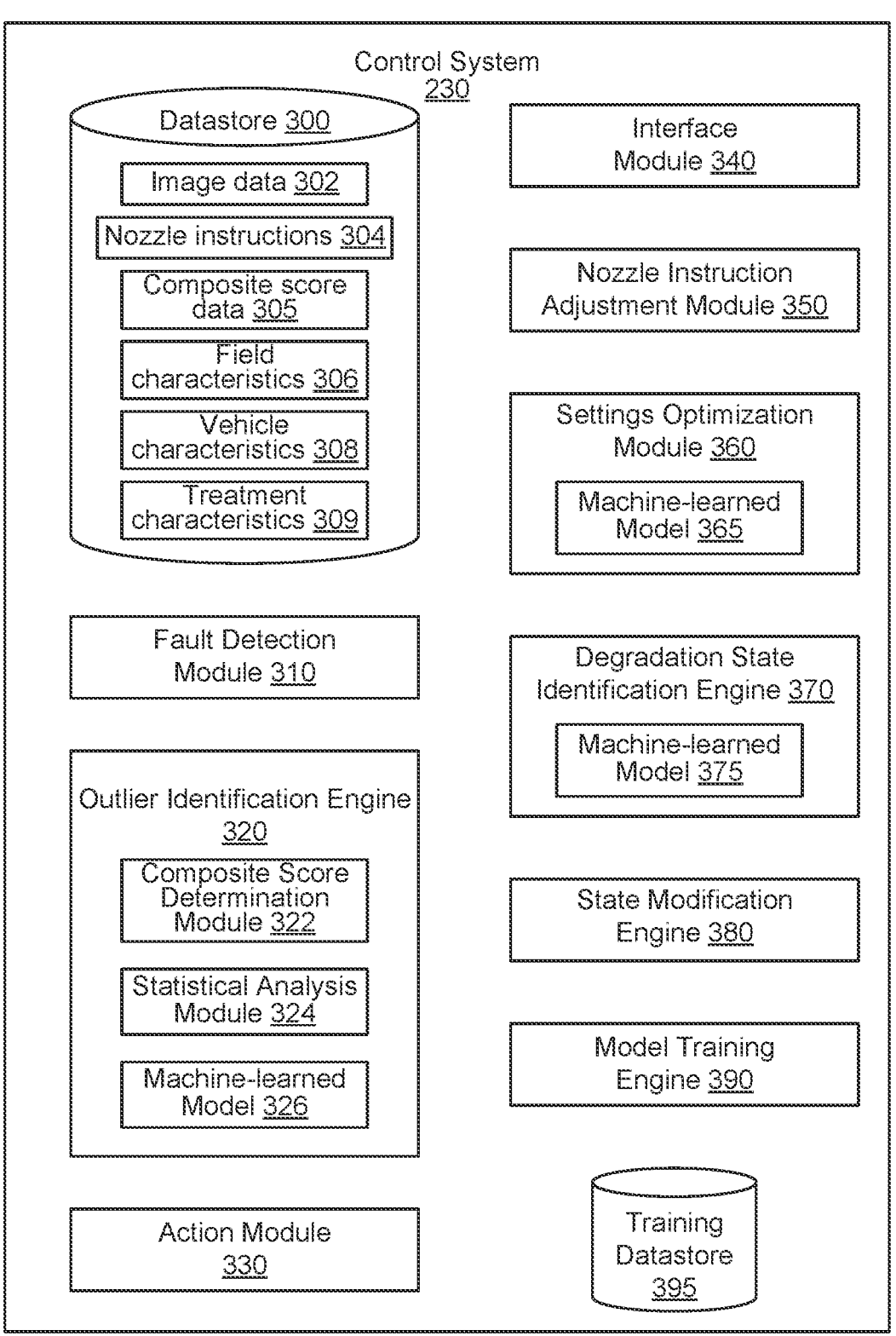
FIG. 3 is a block diagram of a control system of the system environment of FIG. 2, in accordance with one or more embodiments.

FIG. 3 is a block diagram of the control system 230 of FIG. 2, in accordance with one or more embodiments. Referring to FIG. 3, the control system 230 includes a datastore 300, a fault detection module 310, an outlier identification engine 320, an action module 330, an interface module 340, a nozzle instruction adjustment module 350, a settings optimization module 360, a degradation state identification engine 370, a state modification engine 380, a model training engine 390, and a training datastore 395. The datastore 300 may include different types of data utilized or generated by the control system 230. For example, the datastore 300 may store image data 302, nozzle instructions 304, composite score data 305, field characteristics 306, vehicle characteristics 308, and treatment characteristics 309. The outlier identification engine 320 may include a composite score determination module 322, a statistical analysis module 324, and one or more machine-learned models 326. The settings optimization module 360 may include one or more machine-learned models 365. The degradation state identification engine 370 may also include one or more machine-learned models 375. In different embodiments, the control system 230 may include fewer or additional components. The control system 230 may also include different components. In one or more embodiments, some of the modules and engines of the control system 230 may be implemented locally onboard the control system 130 of the farming machine 100, while some other modules and engines of the control system 230 may be implemented offboard the control system 130 of the farming machine 100 (e.g., on a central server connected via a network to a plurality of farming machines 100).

The image data 302 stored in the datastore 300 may be data corresponding to the images captured by the camera array 210 of FIG. 2 or the detection mechanism 110 of FIGS. 1A-1C. In other embodiments, the image data 302 may be satellite image data captured by a satellite. For example, while operating in an autonomous mode, the farming machine 100 of FIG. 1 may navigate the field 160 corresponding to a geographic area while the detection mechanism 110 automatically operates to capture georeferenced images at a determined frequency of portions of the geographic area and store the captured images as the image data 302 in the datastore 300. The datastore 300 may further store metadata in association with the image data 302. For example, the metadata may include a timestamp, location information (e.g., geolocation data, GPS data), local weather information, elevation information, etc. Some or all of the metadata may be captured by sensors included in the detection mechanism 110 (or otherwise disposed on the farming machine).

The control system 230 may access the image data 302 and analyze the accessed image data to generate respective nozzle instructions 304 for components 222 (e.g., spray nozzles) of the treatment mechanism 120. For example, the nozzle instructions 304 for components 222 may be generated at the determined frequency with which the image data 302 is captured by the corresponding cameras 212. As another example, the nozzle instructions 304 for the components 222 may be generated at a frequency that is different from the image capture frequency. The nozzle instructions may indicate particulars of a target spray operation for a given portion of the field corresponding a given nozzle 222. For example, a nozzle instruction may indicate for a given nozzle at a given location, for a whether or not to spray at that location, and if yes, the droplet size or amount, the angle, the heading of the spray, and the like.

In one or more embodiments, the nozzle instructions 304 may be generated for each portion of the geographic area captured by a corresponding camera 212 of the camera array 210. For example, in case of an array of spray nozzles 222 respectively corresponding to an array of image sensors 212, the control system 230 may respectively generate nozzle instructions 304 for each spray nozzle 222 based on corresponding image data 302 captured by corresponding one or more image sensors 212 and based on the corresponding farming objective or determined farming action (e.g., targeted spray for killing weeds).

The frequently generated nozzle instructions 304 for each component or spray nozzle 222 may form a set of instructions for that nozzle 222. The set may be defined based on predetermined criteria like elapse of a predetermined period of time (e.g., 5 minutes of instructions to a given nozzle while the farming machine is moving and performing the targeted spray treatment), capture of a predetermined number of images corresponding to the nozzle 222, instructions corresponding to a predefined portion of the field, and the like. The nozzle instructions 304 (e.g., sets of instructions respectively provided to the plurality of spray nozzles (e.g., plurality of components 222) may be stored in datastore 300.

The fault detection module 310 may detect one or more types of faults (e.g., image processing defects, environmental conditions, camera or nozzle not operative or otherwise operating incorrectly) with one or more cameras 212 of the camera array 210 or one or more components 222 of the component array 220. For example, the fault detection module 310 may include logic that detects when a particular camera 212 or component 222 is in a fault state. In response to the fault detection module 310 detecting a fault state with respect to a particular camera 212 or component 222, the control system 230 may be configured to take one or more actions. For example, the control system 230 may automatically place the spray nozzle array 220 (treatment mechanism 120) in a fallback mode in which the farming machine 100 (or one or more identified components 222 of the farming machine 100) is automatically switched from a targeted spray mode to a broadcast spray mode. As another example, the control system 230 may automatically pause the operation of the farming machine 100 and notify an operator. As another example, the control system 230 may automatically change one or more settings (e.g., reduce speed of the machine 100) based on the detected fault state.

The outlier identification engine 320 is configured to supplement the fault state detection by the fault detection module 310 by automatically identifying additional fault states and taking appropriate action. The outlier identification module 320 accesses the sets of nozzle instructions 304 stored in the datastore 300 for the respective nozzles 222 in the nozzle array 220 and analyzes the sets of instructions respectively provided to the plurality of spray nozzles. Based on the analysis, the outlier identification module 320 identifies a spray performance of at least one spray nozzle 222 from among the plurality of spray nozzles 222 as an outlier Identification of marginal system faults is difficult because it requires an external reference like fixture or prescribed calibration routing during runtime to identify poor and marginal performance. The outlier identification engine 320 takes advantage of the configuration of the farming machine 100 with multiple cameras 212 by using the overall relationship between individual predictions of the cameras 212 and performance as a reference to identify anomalies. Thus, spray performance outliers identified by the outlier identification engine 320 point to events that are not currently detected and controlled by the fault detection module 310.

The composite score determination module 322 generates, for each of the plurality of spray nozzles 222, a composite score based on the set of instructions provided by the autonomous agricultural vehicle to the spray nozzle 222.

In one or more embodiments, the set of instructions for a given spray nozzle 222 may correspond to instructions sequentially provided by the farming machine 100 to the given spray nozzle 222 over a predetermined period (e.g., 5 minutes) or respectively for a predetermined number of portions of the geographic area (e.g., geographic area corresponding to a predetermined number of image frames corresponding to a given nozzle).

In one or more embodiments, the composite score determination module 322 generates the composite scores for the respective spray nozzles 222 or corresponding cameras 212 in real-time or near-real-time. For example, the composite scores may be generated based on a "moving window" of most recent nozzle instructions 304 generated for a given spray nozzle 222. As another example, the composite scores may be generated at a predetermined frequency that is less than the generation frequency of the nozzle instructions (e.g., nozzle instructions generated every second and composite score generated every minute based on last 60 seconds of nozzle instructions). In other embodiments, the composite score determination module 322 may generate the composite scores after completion of a treatment plan corresponding to the stored nozzle instruction data 304. For example, after completion of a targeted herbicide spraying operation in a field, the nozzle instruction data 304 may be uploaded to a central server, and the composite score determination module 322 deployed at the server may use the received instruction data to generate the composite scores for the respective nozzles or corresponding image sensors. The composite scores generated by the composite score determination module 322 may be stored as composite score data 305 in the datastore 300.

Figure 4:
FIG. 4 illustrates an exemplary user interface depicting composite score data based on instructions provided by the farming machine to spray nozzles, in accordance with one or more embodiments.

FIG. 4 illustrates an exemplary user interface 400 depicting the composite score data 305 generated by the composite score determination module 322, in accordance with one or more embodiments. In the example shown in FIG. 4, the composite scores are generated for respective nozzles (e.g., each spray nozzle of an array of 97 spray nozzles) based on corresponding sets of nozzle instructions provided to the respective nozzles over a predetermined period 410. For each nozzle, the composite score data 305 indicates the proportion of the geographic area covered by the farming machine 100 where the nozzle was instructed to spray 415 and the proportion of the geographic area where the nozzle was instructed to not spray 420.

Returning to FIG. 3, the statistical analysis module 324 performs a statistical analysis operation on the composite scores 305 respectively generated for the plurality of spray nozzles 222. In one or more embodiments, the statistical analysis operation comprises comparing a composite score of a first one of the plurality of spray nozzles 222 with composite scores of another one or more of the plurality of spray nozzles 222, and determining, based on the comparison, whether a difference between the composite score of the first spray nozzle 222 and the composite scores of the another one or more of the plurality of spray nozzles 222 meets a predetermined condition.

In one or more embodiments, the another one or more of the plurality of spray nozzles 222 with which the composite score of the first spray nozzle 222 is compared by the statistical analysis module 324 may include a subset of the plurality of spray nozzles 222 that are adjacent to the first spray nozzle. In one or more embodiments, the another one or more of the plurality of spray nozzles 222 with which the composite score of the first spray nozzle 222 is compared by the statistical analysis module 324 may include a subset of the plurality of spray nozzles 222 that are in a predetermined vicinity of the first spray nozzle 222. Using FIG. 4 as an example, for a nozzle N (N being a natural number), the subset of nozzles 222 adjacent the nozzle N may include nozzles N–1 and N+1. Further, using FIG. 4 as an example, for a nozzle N (N being a natural number), the subset of nozzles 222 that are in a predetermined vicinity of the nozzle N may include one or more nozzles closest to the nozzle N (e.g., one or more of nozzles N–1, N+1, N–2, N+2, ... N–n, N+n; n being a natural number).

In one or more embodiments, the predetermined condition for the comparison determination by the statistical analysis module 324 may include determining whether the difference between the composite score of the first spray nozzle 222 and the composite scores of the another one or more of the plurality of spray nozzles 222 is more than a predetermined number of standard deviations away from an average composite score (e.g., three or five standard deviations away). As another example, the predetermined condition for the comparison determination by the statistical analysis module 324 may include determining whether the difference is greater than a predetermined threshold (e.g., raw percentage difference (e.g., more than 30%) in level of activity between adjacent nozzles). In the example shown in FIG. 4, the statistical analysis module 324 may detect nozzles 74 (e.g., underspray condition 430) and 81 (e.g., overspray condition 440) as meeting the predetermined condition.

In one or more embodiments, the outlier identification engine 320 may include one or more machine learned models 326 that are trained using historical composite score data of historical farming machines labeled to indicate patterns in the data that indicate nozzle spray performance outliers. For example, based on subsequently performed maintenance or service events, composite score data corresponding to specific nozzles or image sensors may be labeled as being an "outlier" in a dataset including composite score data for a historical targeted spray operation. The machined-learned model 326 may be trained based on such labeled training data to identify similar patterns in a composite score dataset for a target farming machine to indicate outliers.

The action module 330 performs an action with respect to a spray nozzle 222 (e.g., nozzles 74, 81 in FIG. 4) that is identified as the outlier. For example, the action may include notifying an operator (e.g., via the interface module 340) of the spray nozzle 222 identified as the outlier.

In one or more embodiments, the outlier identification engine 320 may further determine whether the predetermined condition meets a low confidence threshold. The low confidence threshold may indicate that the system has a low confidence in the predicted nozzle instructions, based on which the corresponding composite score is determined. For example, the machine-learned model 326 may output a probability of a composite score in a set of input composite scores as being the "outlier". And based on the probability being higher than a predetermined amount, the outlier identification engine 320 may determine that the predetermined condition meets the low confidence threshold.

The action module 330 may be configured so that, in response to determining that the predetermined condition with respect to the outlier spray performance spray nozzle 222 meets the low confidence threshold, the action module 330 automatically controls the treatment mechanism 120 to perform a spray operation in a fallback mode (e.g., switch from autonomous targeted spray mode to fallback mode). In one or more embodiments, the fallback mode may be defined based on a treatment objective and/or a treatment action. For example, when a camera/nozzle's spray is significantly lower (e.g., meeting the low confidence threshold) during a herbicide application (e.g., underspray condition

430 in FIG. 4), the action module 330 may automatically control the treatment mechanism 120 to fallback to a broadcast spray operation instead of targeted spray operation (e.g., broadcast spray all nozzles 222; broadcast spray for outlier nozzle 222 and targeted spray for other nozzles 222; and the like). As a result, the system can ensure that no plants are missed during the herbicide application.

As another example, when a camera/nozzle's spray is significantly higher (e.g., meeting the low confidence threshold) during a plant growth promotor application (e.g., overspray condition 440 in FIG. 4), where the product is valuable and cannot be wasted (i.e., broadcast spray not feasible due to product being expensive or in short supply), the action module 330 may automatically control the treatment mechanism 120 to halt the targeted spray operation (e.g., halt spray of all nozzles 222; halt spray for outlier nozzle 222 and continue targeted spray for other nozzles 222; and the like). As a result, the system can ensure that valuable product is not wasted. The action module 330 may present the user (e.g., via the interface module 340) is presented with the deviation so that they can address the issue and resume targeted spray.

Interface module 340 is an interface for a user and/or a third-party software platform to interact with the control system 230 and vice-versa. The interface module 340 may be a web application that is run by a web browser on a user device or a software as a service platform that is accessible by a user device through the network 250. In one embodiment, the interface module 340 may use application program interfaces (APIs) to communicate with user devices or third-party platform servers, which may include mechanisms such as webhooks.

The action module 330 may further be configured so that, in response to determining that the predetermined condition with respect to the outlier spray performance spray nozzle 222 does not meet the low confidence threshold, the action module 330 automatically controls the nozzle instruction adjustment module 350 to adjust signal intensities of instructions provided by the autonomous agricultural vehicle to the first spray nozzle to compensate for the difference. In one or more embodiments, whether the action module 330 automatically switches the targeted spray to the fallback mode, or automatically adjusts signal intensities by operating the nozzle instruction adjustment module 350, and/or automatically notifies the user with respect to a spray nozzle determined to be the outlier, is configurable by the user by interacting with the interface module 340.

The nozzle instruction adjustment module 350 may adjust the signal intensities based on the instructions from the action module 330 so that the outlier spray performance of the identified nozzle trends toward being in-line with that of the other spray nozzles 222 that are adjacent to or in the predetermined vicinity of the outlier nozzle 222. For example, in response to the predetermined condition indicating an overspray condition for the outlier camera/nozzle 222, the nozzle instruction adjustment module 350 may increase an image analysis confidence threshold for an image sensor 212 corresponding to the first spray nozzle 222 so as to cause attenuation of a signal intensity (e.g., causing sensor to detect less "green" in an image). As another example, in response to the predetermined condition indicating an underspray condition for the outlier camera/nozzle 222, the nozzle instruction adjustment module 350 may lower an image analysis confidence threshold for an image sensor 212 corresponding to the first spray nozzle 222 so as to cause boosting of a signal intensity (e.g., causing sensor to detect more "green" in an image).

Thus, for example, in case a lens of an image sensor being partially obstructed (e.g., covered with slime), but not obstructed enough to trigger a fault state by the operation of the fault detection module 310, the outlier identification module 320 may detect corresponding nozzle instructions to be outliers as compared to the nozzle instructions provided to the neighboring nozzles. And in this case, the nozzle instruction adjustment module 350 may lower an image analysis confidence threshold for the image sensor 212 thereby causing the sensor to detect more "green" in an image, and as a result, ameliorating the underspray condition that is caused by the image sensor being partially obstructed.

In one or more embodiments, the action module 330 may utilize a rule base to determine which action to perform with respect to a spray nozzle 222 that is identified as the outlier. For example, the rule base may include "if-then" rules that specify criteria based on which a given action is selected. The rules may take as input, the characteristics associated with the spray nozzle 222 that is identified as the outlier (e.g., field characteristics 306, vehicle characteristics 308, treatment characteristics 309, data output from the outlier identification engine 320) to determine the action to be used for the outlier spray nozzle 222.

The settings optimization module 360 is configured to change (e.g., set, optimize) one or more settings of the farming machine 100 based on the spray performance of the outlier nozzle 222 detected by the outlier identification engine 320. For example, a targeted spray operation may have associated field characteristics 306, vehicle characteristics 308, and treatment characteristics 309. The field characteristics 306, vehicle characteristics 308, and treatment characteristics 309 may be stored in the datastore 300 in association with the corresponding image data 302, corresponding nozzle instructions 304, and corresponding composite score data 305. The field characteristics may include characteristics associated with the field 160 where the targeted spray operation is being performed by the farming machine 100 (e.g., a crop type, a weed type, weather, a time of day, a time of year, and a geographic region). The vehicle characteristics may include characteristics associated with the farming machine (e.g., vehicle type, vehicle speed, settings of different features of the farming machine 100, current state, current mode, and the like). The treatment characteristics include characteristics associated with the treatment (e.g., treatment type, treatment objective).

The setting optimization module 360 may include one or more machine-learned models 365 that are trained using historical data of historical farming machines during targeted spray operations labeled to indicate settings of farming machines that led to improvement of spray performance after detection of outlier nozzles/cameras.

For example, in response to detecting that a change in a setting (e.g., reduce vehicle speed to a predetermined speed, turn automatic dust detection off, etc.) caused improvement in the composite score corresponding to a specific nozzle or image sensor identified as being an "outlier" in a dataset including composite score data for a historical targeted spray operation, the changed setting may be labeled as ground truth in the training dataset. The machined-learned model 365 may then be trained based on such labeled training data to identify similar instances of outliers in a composite score dataset for a target farming machine and recommend corresponding learned settings as suggestions for improving the spray performance of the "outlier" nozzle/sensor. In one or more embodiments, the settings optimization module 360 may interact with the interface module 340 to recommend identified settings (e.g., change vehicle speed to specified speed, turn on/off specified setting or mode of vehicle (e.g., turn automatic dust detection to off), and the like) to the user. In other embodiments, the settings optimization module 360 may automatically implement the settings identified by the machine-learned model 365 and notify the user of the implemented (changed, modified) settings.

Consider the following example: a camera (e.g., one of the cameras 212) may pass the end-of-line testing by the fault detection module 310 during operation, but also be under-sensitive to excess green. This would cause some weed plants not to be identified by this camera during a targeted herbicide spray operation. This will result in weeds that reduce crop yield. In a system where one camera controls ~3% of the boom/field, if the camera only detected at 50% and the average weed pressure was 25%, this would result in 0.4% of the field left with weeds (3%×25%× 50%=0.4%], which would reduce crop yield. In the above example, if the camera was overspraying by 50%, then the customer would use 1.5% more applicant during the targeted spray operation, leading to wastage.

In the above example, if all of the cameras 212 of the camera array 210 are faulty or fail over time in the same manner (e.g., faulty batch of image sensors), a reference point to determine spray performance degradation for a particular image sensor or corresponding spray nozzle based on data from a larger set of image sensors or corresponding nozzles may be unavailable. In this case, the control system 230 may utilize data from other sources (e.g., from other vehicles operating in the same or other similar field characteristics, vehicle characteristics, treatment characteristics, and the like; data from historical targeted spray operations for the target vehicle, and the like) to analyze the spray performance of the autonomous agricultural vehicle and identify degradation states of the vehicle.

The degradation state identification engine 370 may identify an autonomous agricultural vehicle degradation state based on nozzle instructions 304 provided by the farming machine 100 to spray nozzles 222 of the spray nozzle array 220. For example, the degradation state identification engine 370 may access the composite score data 305 corresponding to the nozzle instructions 304 provided by the farming machine 100 to spray nozzles 222 of the spray nozzle array 220 and identify the autonomous agricultural vehicle degradation state based on composite score data 305. A degradation state may refer to any state of the farming machine 100 during operation where performance of the machine 100 with respect to a treatment action or objective is degraded to a suboptimal level (e.g., defective image sensors, defective nozzle actuation mechanisms, excessive vehicle speed, and the like).

The degradation state identification engine 370 may include one or more machine-learned models 375 that are trained using a training data set including historical nozzle instructions provided by historical autonomous agricultural vehicles to spray nozzles of the historical autonomous agricultural vehicles. In one or more embodiments, the degradation state identification engine 370 may be deployed on a remote server that is configured to receive historical data (e.g., sensor data, navigation data, verification data, field characteristics, vehicle characteristics, treatment characteristics, nozzle instructions generated based on measured sensor data) generated from respective (fully autonomous or partially autonomous) targeted spray operations of a plurality of autonomous agricultural vehicles operating in respective fields in one or more geographic areas. The historical data may include data of the past targeted spray operations performed by the target agricultural vehicle in the target geographic area or field (e.g., spray operation performed by the target vehicle in the same field in past seasons).

The degradation state identification engine 370 may then receive the nozzle instructions 304 provided by the current or target farming machine 100 to spray nozzles 222 of the target farming machine 100 and apply the machine-learned model 375 to the received nozzle instructions 304 provided to the spray nozzles 222 of the target farming machine 100. For example, the degradation state identification engine 370 may access the composite score data 305 corresponding to the nozzle instructions 304 provided by the target farming machine 100 to spray nozzles 222 of the spray nozzle array 220 and apply the machine-learned model 375 to the composite score data 305 corresponding to the spray nozzles 222 of the target farming machine 100.

Figure 5A:
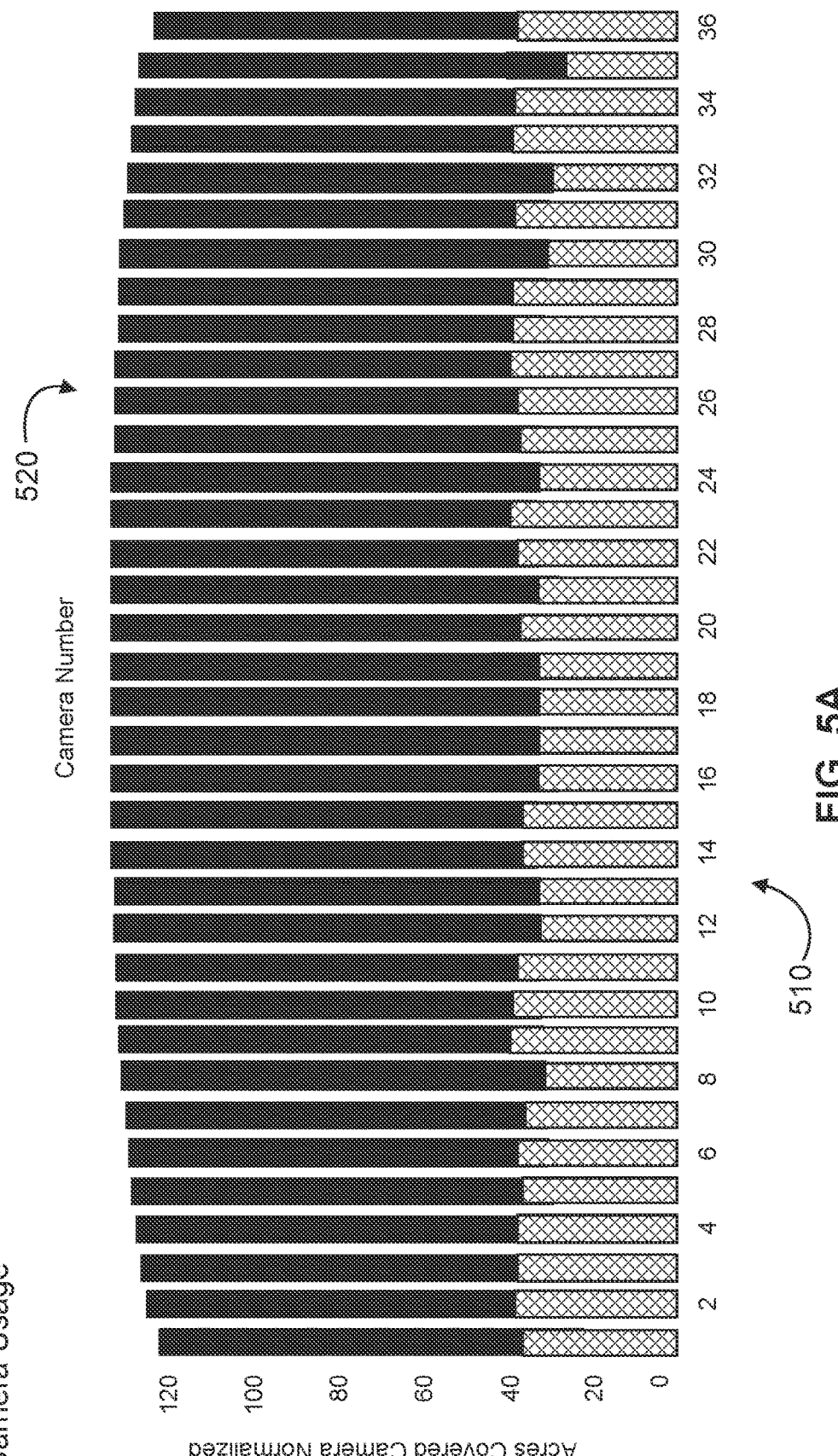
FIG. 5A illustrates an exemplary user interface depicting composite score data input to a machine-learned model, in accordance with one or more embodiments.

FIG. 5A illustrates an exemplary user interface 500 depicting composite score data input to the machine-learned model 375, in accordance with one or more embodiments. In the example shown in FIG. 5A, the composite scores are generated for respective image sensors (e.g., cameras 212 of the camera array 210; 36 sensors in the example of FIG. 5A) over a predetermined period. For each image sensor, the composite score indicates the proportion of the geographic area covered by the farming machine 100 where a corresponding nozzle(s) was instructed to spray 510 and the proportion of the geographic area where the corresponding nozzle(s) was instructed to not spray 520.

Figure 5B:
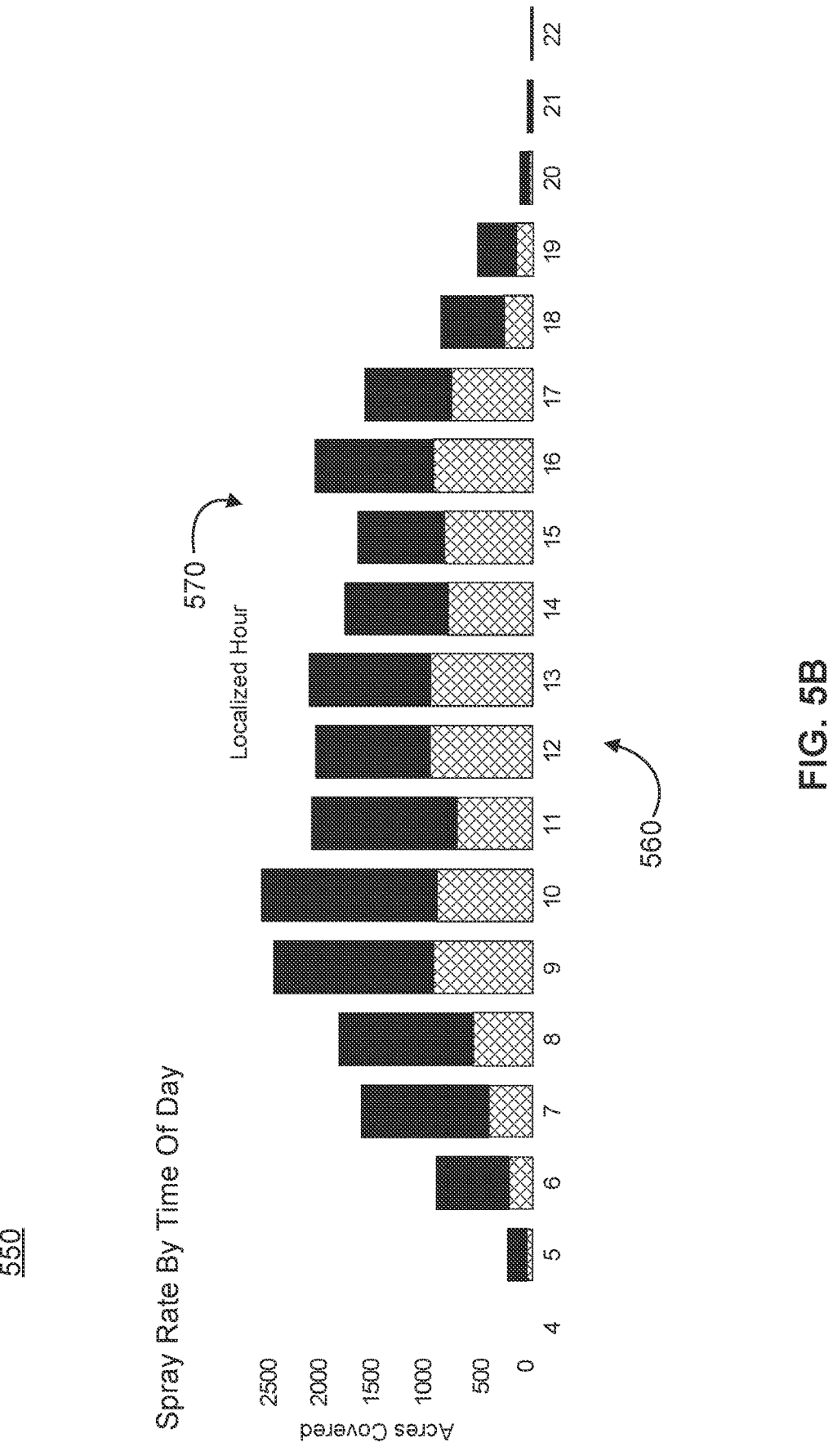
FIG. 5B illustrates exemplary nozzle instruction data localized by the hour, in accordance with one or more embodiments.

FIG. 5B illustrates an exemplary user interface 550 depicting composite score data localized by the hour that may be input to the machine-learned model 375, in accordance with one or more embodiments. In the example shown in FIG. 5B, the composite scores corresponding to the entire nozzle array 220 are generated and localized on a per-hour basis. For each hour of the day, the composite score indicates the proportion of the geographic area covered by the farming machine 100 where the nozzle array 220 was instructed to spray 560 and the proportion of the geographic area where the nozzle array 220 was instructed to not spray 570.

Based on the input, the machine-learned model 375 may identify features or variables based on which the degradation state identification engine 370 may identify a degradation state of the target farming machine 100. For example, the machine-learned model 375 may apply a regression analysis based supervised learning technique to identify one or more nearest neighbors in the training dataset and identify a degradation state by comparing the input composite scores with the historical composite scores of the identified nearest neighbors.

For example, if the input composite score is different by a threshold amount from the historical composite scores of the identified nearest neighbors in the training dataset, the machine-learned model 375 may detect a degradation state. In more specifically identifying the (specific) degradation state, the machine-learned model 375 may compare independent variables of the nearest neighbors with the independent variables of the input and identify variables that differ by more than a predetermined threshold. The degradation state identification engine 370 may further include rules or logic based on which specific degradation states may be identified based on the output of the model 375.

For example, if an underspray condition is detected and if the vehicle speed of the nearest neighbor in the training dataset is lower (e.g., lower than a threshold) than the input vehicle speed, the degradation state identification engine 370 may detect the excessive vehicle speed as being in the degradation state. As another example, if the output of the verification mechanism 150 of the nearest neighbor in the training dataset is more than a threshold level different than the output of the verification mechanism 150 that is input to the model, then the degradation state identification engine 370 may identify the spray nozzle actuation mechanism of the target farming machine 100 as being in the degradation state.

As another example, if a comparison between the historical localized hour data of the nearest neighbor in the training dataset with the input localized hour data indicates (based on the output of the machine-learned model 375) that the spray performance of the input and the nearest neighbor was similar during the daylight hours but differed by more than a threshold amount during night time (e.g., less than threshold amount of ambient light) hours, the degradation state identification engine 370 may identify the image sensor array 220 of the target farming machine 100 as being in the degradation state. Above examples are for illustration only and not intended to be limiting. The machine-learned model 375 can similarly be trained to identify and output additional independent variables that are "outliers" from their nearest neighbors, and the degradation state identification engine 370 can include additional logic to identify additional degradation states based on the identified outliers output from the model.

In one or more embodiments, the machine-learned model 375 may have a transformer-based architecture that relies on the attention mechanism. By utilizing the attention mechanism, the effect of some parts of the input data may be enhanced while the effect of other parts of the input data may be diminished, thus devoting more focus to important parts of the data. For example, in the degradation state identification context, the model may be trained to give more attention to past targeted spray operations performed by the target farming machine in the target geographic area or field 160 than targeted spray operations performed by other farming machines in other geographic areas. The machine-learned model 375 may also identify one or more settings (e.g., turn a particular feature on or off) of the farming machine 100 during the targeted spray operation based on the output.

The machine-learned model 375 may further include a product estimator model that is trained based on the historical satellite image data that is labeled based on corresponding historical image data captured by image sensors of historical autonomous agricultural vehicles and corresponding historical nozzle instruction data indicating an amount of product that was used to complete historical targeted spray operations in historical fields. The model can then take as input satellite image data of a target field where a targeted spray operation is about to be performed, and provide as output, an estimate of an amount of product (e.g., percentage of tank volume) that will be required to complete the targeted spray operation in the target field. The model can also be used as a savings calculator tool.

The state modification engine 380 may modify a state of the target autonomous agricultural vehicle in response to the degradation state identification engine 370 identifying the degradation state for the target autonomous agricultural vehicle using the machine-learned model. The state modification engine 380 may include predetermined rules or logic to automatically modify the state of the target vehicle when certain conditions are met and based on the detected degradation state. In modifying the state of the target vehicle, the state modification engine 380 may take into account the characteristics (e.g., field characteristics 306, vehicle characteristics 308, treatment characteristics 309) associated with the current targeted spray operation performed by the target vehicle.

For example, when the degradation state is related to the image sensor array during a herbicide application (e.g., underspray condition), the state modification engine 380 may automatically control the treatment mechanism 120 to switching a spraying behavior of the target autonomous agricultural vehicle to a fallback mode in which a broadcast spray operation is performed instead of a targeted spray operation to ensure that no plants are missed during the herbicide application. Alternately, based on user settings, the state modification engine 380 in the above example may automatically switch an operation of the target autonomous agricultural vehicle from an autonomous mode to a manual mode or pause the operation of the target autonomous agricultural vehicle. As another example, if excessive vehicle speed is detected as the degradation state, the state modification engine 380 may automatically change one or more settings of the target autonomous agricultural vehicle to reduce the speed of the vehicle to a target speed. As another example, if the image sensor array 220 of the target farming machine 100 as being in the degradation state, the state modification engine 380 may automatically notify an operator to perform a maintenance operation for the target autonomous agricultural vehicle. The maintenance operation notification may ask the operator to replace or service one or more components (e.g., image sensor array, spray nozzle actuation mechanism, etc.) of the target autonomous agricultural vehicle.

Model training engine 390 trains machine-learned models (e.g., models 326, 365, 375) of the control system 230. Model training engine 390 accesses data for training the models in the training datastore 395. Training data can include historical composite score data of historical farming machines labeled to indicate patterns in the data that indicate nozzle spray performance outliers. The training data may further include labeled historical data of historical farming machines during targeted spray operations labeled to indicate settings of farming machines that led to improvement of spray performance after detection of outlier nozzles/cameras. The historical data may include the historical field characteristics, the historical vehicle characteristics, and the historical treatment characteristics associated with the targeted spray operation that led to improvement of spray performance after detection of outlier nozzles/cameras. The training data may further include historical nozzle instructions provided by historical autonomous agricultural vehicles to spray nozzles of the historical autonomous agricultural vehicles, and additional contemporaneous data corresponding to the historical nozzle instructions (e.g., image data, satellite image data, sensor data, navigation data, verification data, field characteristics, vehicle characteristics, treatment characteristics, nozzle instructions generated based on measured sensor data).

The model training engine 390 may submit data for storage in training datastore 395. Model training engine 390 may receive labeled training data from a user or automatically label training data (e.g., using computer vision etc.). The model training engine 390 uses the labeled training data to train one or more machine-learned models. In one or more embodiments, model training engine 390 uses training data labeled with indications of what the spray performance of an outlier nozzle or outlier image sensor is like, what settings (e.g., vehicle speed, turning a particular feature on or off) lead to improvement of the spray performance of an outlier nozzle or outlier image sensor, what patterns in the data indicate different measurable degradation states of an autonomous agricultural vehicle during a targeted spray operation, and the like.

In one or more embodiments, the model training engine 390 uses user feedback to re-train machine-learned models. The model training engine 390 may curate what training data to use to re-train a machine-learned model based on a measure of satisfaction provided in the user feedback. For example, the model training engine 390 receives user feedback indicating that a user is highly satisfied with a state modification based on detection of a degradation state, a change in a setting of a vehicle, or detection of a particular nozzle or sensor in the array as being in a fault state. The model training engine 390 may then strengthen an association between, e.g., composite scores of neighboring nozzles and the composite score of the target outlier nozzle that received the high satisfaction rating from the user by creating new training data using the nozzle instructions, the composite scores, the field characteristics, the vehicle characteristics, the treatment characteristics, and respective machine-learned model outputs associated with the high satisfaction to re-train one or more of the machine-learned models.

In one or more embodiments, the model training engine 390 attributes weights to training data sets or feature vectors. The model training engine 390 may modify the weights based on received user feedback and re-train the machine-learned models with the modified weights. By training a machine-learned model in a first stage using training data before receiving feedback and a second stage using training data as curated according to feedback, the model training engine 390 may train machine-learned models of the control system 230 in multiple stages.

Example Process for Identifying a Spray Nozzle Whose Spray Performance is an Outlier FIG. 6 is a flow chart 600 illustrating a process of identifying a spray nozzle whose spray performance is an outlier, in accordance with one or more embodiments. It should be noted that the process illustrated herein can include fewer, different, or additional steps in other embodiments. The control system 230 accesses 610, for each of a plurality of spray nozzles (e.g., each nozzle 222 of nozzle array 220) of an autonomous agricultural vehicle (e.g., farming machine 100), a set of instructions (e.g., nozzle instructions 304; set of instructions corresponding to a composite score for one of the nozzles in FIG. 4) provided by the autonomous agricultural vehicle to the spray nozzle, each instruction in the set generated by analyzing a respective image (e.g., image data 302) of a portion of a geographic area (e.g., field 160) captured by the autonomous agricultural vehicle. The control system 230 identifies 620 a spray performance of at least one spray nozzle from among the plurality of spray nozzles as an outlier (e.g., nozzles corresponding to 430, 440 in FIG. 4) by analyzing the sets of instructions respectively provided to the plurality of spray nozzles. And the control system 230 performs 630 an action with respect to the at least one spray nozzle identified as the outlier in step 620.

Example Process for Determining the Treatment Plan for a Plant

FIG. 7 is a flow chart 700 illustrating a process of identifying a degradation state of a farming machine (e.g., machine 100) using a machine-learned model (e.g., model 375), in accordance with one or more embodiments. It should be noted that the process illustrated herein can include fewer, different, or additional steps in other embodiments. The control system 230 generates 710 a training data set (e.g., stored in training datastore 395) comprising historical instructions provided by historical autonomous agricultural vehicles to spray nozzles of the historical autonomous agricultural vehicles. The control system 230 trains 720 a machine-learned model (e.g., model 375 trained using the model training engine 390) using the training data set to identify an autonomous agricultural vehicle degradation state based on instructions (e.g., nozzle instructions 304, composite score 305) provided by an autonomous agricultural vehicle to spray nozzles (e.g., nozzles 222 of array 220) of the autonomous agricultural vehicle. The control system receives 730, for a target autonomous agricultural vehicle, instructions (e.g., nozzle instructions 304, composite score 305) provided by the target autonomous agricultural vehicle to spray nozzles (e.g., nozzles 222 of array 220) of the target autonomous agricultural vehicle. The control system applies 740 the machine-learned model (e.g., machine-learned model 375) to the received instructions provided by the target autonomous agricultural vehicle. And in response to identifying a degradation state for the target autonomous agricultural vehicle using the machine-learned model, the control system 230 modifies 750 a state of the target autonomous agricultural vehicle.

Example Computer System

Figure 8:
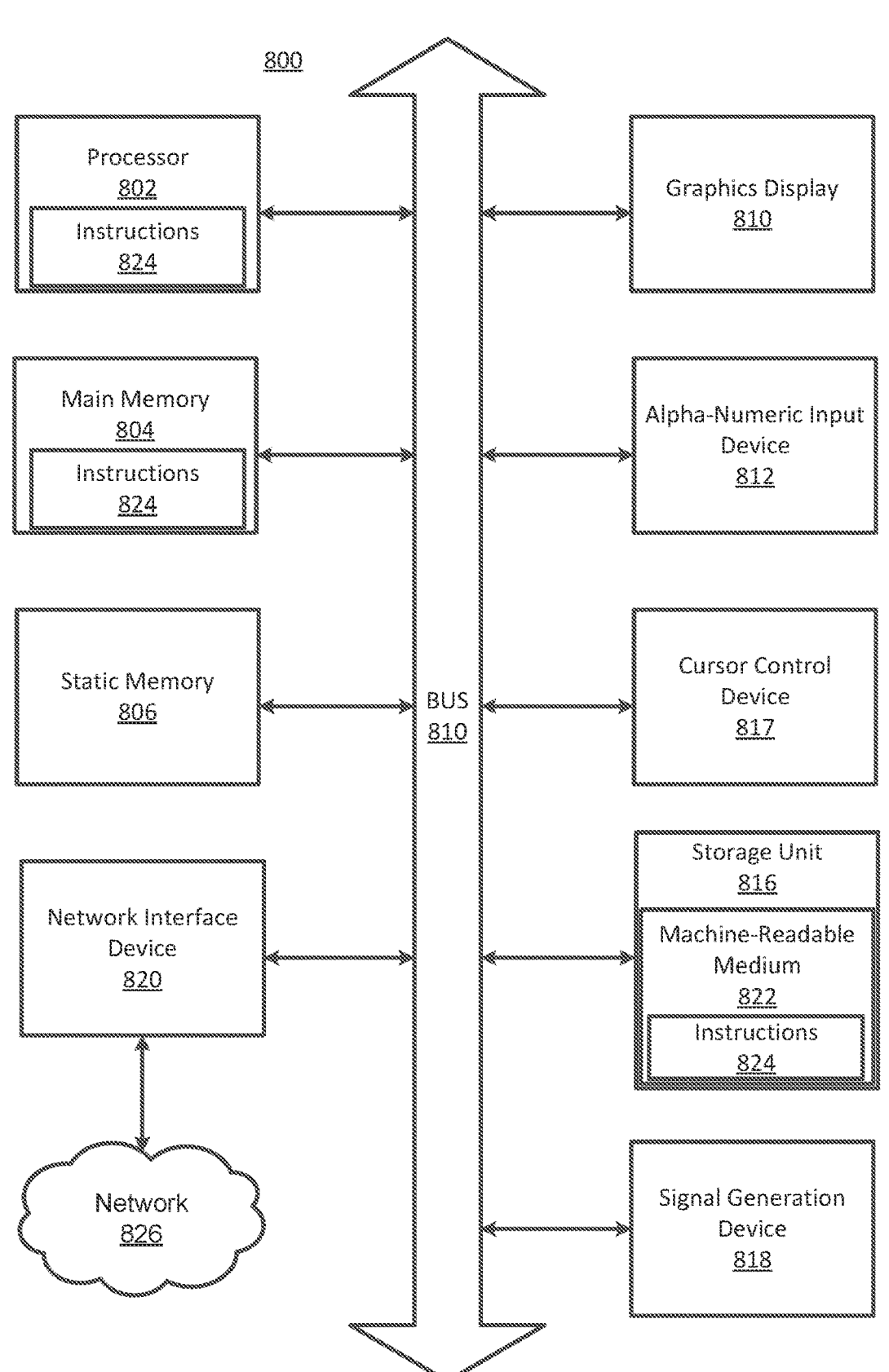
FIG. 8 is a block diagram illustrating components of an example machine for reading and executing instructions from a machine-readable medium, in accordance with one or more example embodiments.

FIG. 8 is a block diagram illustrating components of an example machine for reading and executing instructions from a machine-readable medium, in accordance with one or more example embodiments. Specifically, FIG. 8 shows a diagrammatic representation of the control system 130 described in FIGS. 1A-1C and/or the control system 230 described in FIGS. 2-3, in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 810.

In addition, the computer system 800 can include a static memory 806, a graphics display 810 (e.g., to drive a plasma display panel (PDP), a liquid crystal display (LCD), or a projector). The computer system 800 may also include an alphanumeric input device 812 (e.g., a keyboard), a cursor control device 817 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the control system 130 described in FIGS. 1A-1C and/or the control system 230 described in FIGS. 2-3. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing, for each of a plurality of spray nozzles of an autonomous agricultural vehicle, a set of instructions provided by the autonomous agricultural vehicle to the spray nozzle, each instruction in the set generated by analyzing a respective image of a portion of a geographic area captured by the autonomous agricultural vehicle;
   generating, for each of the plurality of spray nozzles, a composite score based on the set of instructions provided by the autonomous agricultural vehicle to the spray nozzle;
   using the composite scores respectively generated for the plurality of spray nozzles to identify a spray performance of at least one spray nozzle from among the plurality of spray nozzles as an outlier; and
   performing a spray operation in a fallback mode with respect to the at least one spray nozzle identified as the outlier.

2. The method of claim 1, wherein using the composite scores respectively generated for the plurality of spray nozzles comprises:
   performing a statistical analysis on the composite scores respectively generated for the plurality of spray nozzles.

3. The method of claim 2, wherein performing the statistical analysis on the composite scores comprises:
   comparing a composite score of a first one of the plurality of spray nozzles with composite scores of another one or more of the plurality of spray nozzles; and
   determining, based on the comparison, whether a difference between the composite score of the first spray nozzle and the composite scores of the another one or more of the plurality of spray nozzles meets a predetermined condition.

4. The method of claim 3, wherein the another one or more of the plurality of spray nozzles includes a subset of the plurality of spray nozzles that are adjacent to the first spray nozzle.

5. The method of claim 3, wherein the another one or more of the plurality of spray nozzles includes a subset of the plurality of spray nozzles that are in a predetermined vicinity of the first spray nozzle.

6. The method of claim 3, wherein the predetermined condition includes at least one of:
   the difference being more than a predetermined number of standard deviations away from an average composite score; or
   the difference being greater than a predetermined threshold.

7. The method of claim 3, further comprising:
   determining whether the predetermined condition meets a low confidence threshold; and
   in response to determining that the predetermined condition meets the low confidence threshold, performing the spray operation in the fallback mode.

8. The method of claim 7, wherein performing the spray operation in the fallback mode comprises the autonomous agricultural vehicle providing instructions to the first spray nozzle to perform a broadcast spray operation.

9. The method of claim 7, wherein performing the spray operation in the fallback mode comprises the autonomous agricultural vehicle providing instructions to the plurality of spray nozzles to halt the spray operation.

10. The method of claim 7, further comprising:
    in response to determining that the predetermined condition does not meet the low confidence threshold, adjusting signal intensities of instructions provided by the autonomous agricultural vehicle to the first spray nozzle to compensate for the difference.

11. The method of claim 10, wherein adjusting the signal intensities comprise:
    increasing an image analysis confidence threshold for an image sensor corresponding to the first spray nozzle that causes attenuation of a signal intensity in response to the predetermined condition indicating an overspray condition; and
    lowering the image analysis confidence threshold for the image sensor that causes boosting of the signal intensity in response to the predetermined condition indicating an underspray condition.

12. The method of claim 1, wherein a given set of instructions for a given spray nozzle corresponds to instructions sequentially provided by the autonomous agricultural vehicle to the given spray nozzle over a predetermined period of time or respectively for a predetermined number of portions of the geographic area.

13. The method of claim 1, further comprising:
    notifying an operator of the at least one spray nozzle identified as the outlier.

14. An autonomous agricultural vehicle, comprising:
    one or more processors; and
    memory operatively coupled to the one or more processors and comprising instructions that, when executed by the one or more processors, causes the one or more processors to:
       access, for each of a plurality of spray nozzles of the autonomous agricultural vehicle, a set of instructions provided by the autonomous agricultural vehicle to the spray nozzle, each instruction in the set generated by analyzing a respective image of a portion of a geographic area captured by the autonomous agricultural vehicle;
       generate, for each of the plurality of spray nozzles, a composite score based on the set of instructions provided by the autonomous agricultural vehicle to the spray nozzle;
       use the composite scores respectively generated for the plurality of spray nozzles to identify a spray performance of at least one spray nozzle from among the plurality of spray nozzles as an outlier; and perform a spray operation in a fallback mode with respect to the at least one spray nozzle identified as the outlier.

15. The autonomous agricultural vehicle of claim 14, wherein the instructions that cause the one or more processors to use the composite scores respectively generated for the plurality of spray nozzles comprise instructions that cause the one or more processors to:

perform a statistical analysis on the composite scores respectively generated for the plurality of spray nozzles.

16. The autonomous agricultural vehicle of claim 15, wherein the instructions that cause the one or more processors to perform the statistical analysis on the composite scores comprise instructions that cause the one or more processors to:

compare a composite score of a first one of the plurality of spray nozzles with composite scores of another one or more of the plurality of spray nozzles; and determine, based on the comparison, whether a difference between the composite score of the first spray nozzle and the composite scores of the another one or more of the plurality of spray nozzles meets a predetermined condition.

17. The autonomous agricultural vehicle of claim 16, wherein the another one or more of the plurality of spray nozzles includes a subset of the plurality of spray nozzles that are in a predetermined vicinity of the first spray nozzle.

18. The autonomous agricultural vehicle of claim 16, wherein the instructions further cause the one or more processors to:

determine whether the predetermined condition meets a low confidence threshold; and in response to determining that the predetermined condition meets the low confidence threshold, perform the spray operation in the fallback mode.

19. The autonomous agricultural vehicle of claim 14, wherein a given set of instructions for a given spray nozzle corresponds to instructions sequentially provided by the autonomous agricultural vehicle to the given spray nozzle over a predetermined period of time or respectively for a predetermined number of portions of the geographic area.

20. A non-transitory computer-readable recording medium storing instructions that, when executed by one or more processors, cause the one or more processors to perform operations comprising:

accessing, for each of a plurality of spray nozzles of an autonomous agricultural vehicle, a set of instructions provided by the autonomous agricultural vehicle to the spray nozzle, each instruction in the set generated by analyzing a respective image of a portion of a geographic area captured by the autonomous agricultural vehicle;

generating, for each of the plurality of spray nozzles, a composite score based on the set of instructions provided by the autonomous agricultural vehicle to the spray nozzle;

using the composite scores respectively generated for the plurality of spray nozzles to identify a spray performance of at least one spray nozzle from among the plurality of spray nozzles as an outlier; and performing a spray operation in a fallback mode with respect to the at least one spray nozzle identified as the outlier.

\* \* \* \* \*